United States Patent
Friesz

[15] 3,695,427
[45] Oct. 3, 1972

[54] CLASSIFYING SEPARATOR FOR UNPOURED, FLOWABLE ROCK-GRAVEL, SAND AND CEMENT SLURRY MIXTURE FROM CONCRETE MIXER

[72] Inventor: Rheinhardt Friesz, 6113 Cherryhill, Houston, Tex. 77017

[22] Filed: Jan. 8, 1970

[21] Appl. No.: 1,372

[52] U.S. Cl. ........................209/44, 209/462, 209/2
[51] Int. Cl. ...............................................B03b 7/00
[58] Field of Search......209/461, 462, 464, 445, 446, 209/448, 449, 450, 12, 13, 44, 173, 2

[56] References Cited

UNITED STATES PATENTS

| | | | |
|---|---|---|---|
| 2,933,187 | 4/1960 | Old et al. | 209/464 |
| 2,491,912 | 12/1949 | Walker | 209/464 X |
| 2,050,458 | 8/1936 | Ovestrud et al. | 209/12 |
| 3,278,022 | 10/1966 | Moeschler | 209/17 X |
| 1,559,938 | 11/1925 | Chance | 209/173 |
| 2,308,883 | 1/1943 | Kettenbach | 209/173 X |
| 2,942,731 | 6/1960 | Soldini | 209/270 X |

FOREIGN PATENTS OR APPLICATIONS

| | | | |
|---|---|---|---|
| 1,218,530 | 5/1960 | France | 209/464 |
| 553,416 | 12/1956 | Italy | 209/464 |

*Primary Examiner*—Frank W. Lutter
*Assistant Examiner*—Ralph J. Hill
*Attorney*—William E. Ford

[57] ABSTRACT

A separator for unpoured concrete comprising a settling tank with an overflow weir on one side and a screw conveyor extending out of the other side. A washing spray is provided for the portion of the screw conveyor extending out of the settling tank and the main portion of the tank at the overflow end is separated from the upward extension of the conveyor by a screen for preventing the return of rock-gravel being conveyed upwardly into the main portion of the settling tank. The conveyor delivers sand and rock-gravel to a shaker screen for separating same.

7 Claims, 14 Drawing Figures

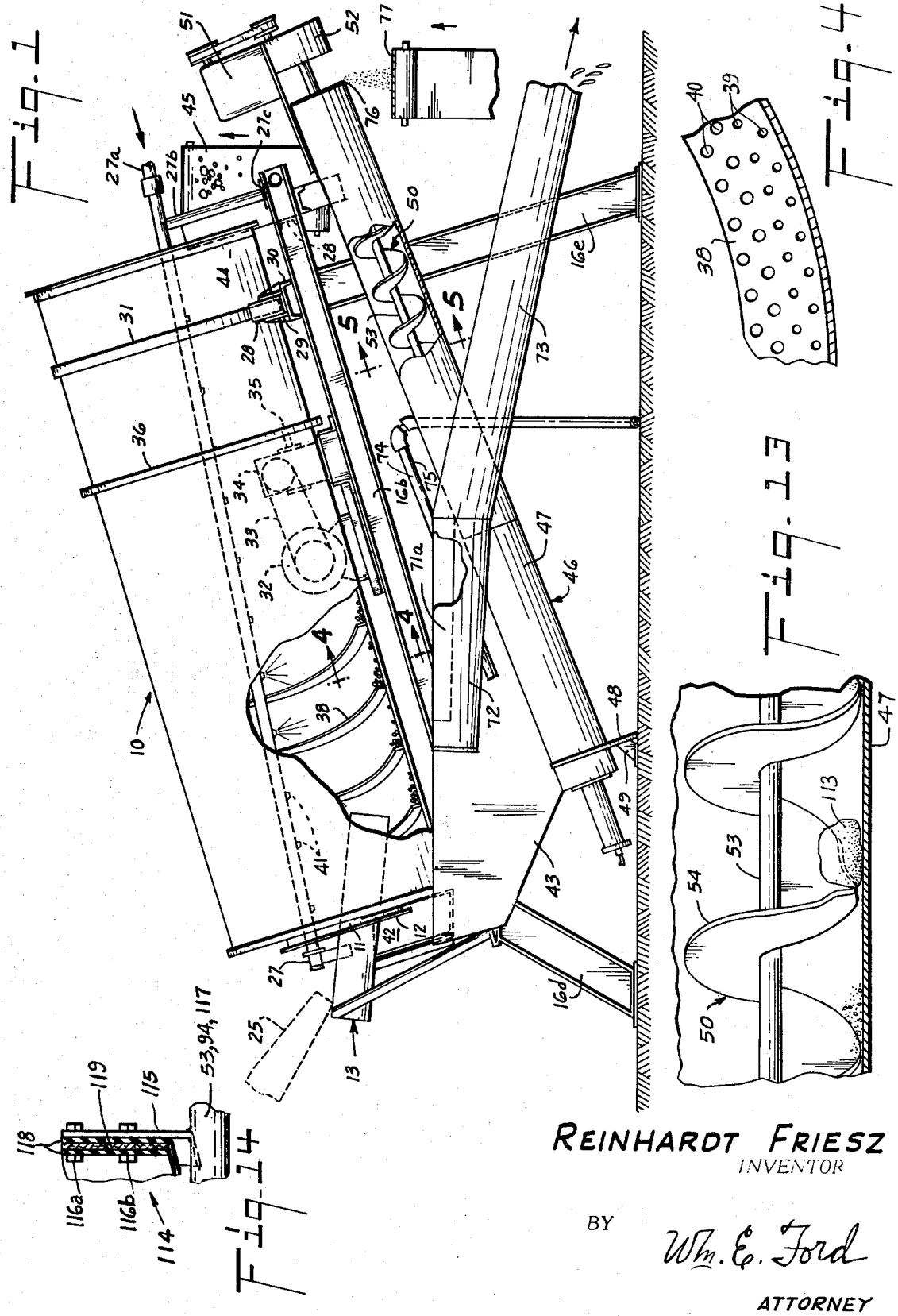

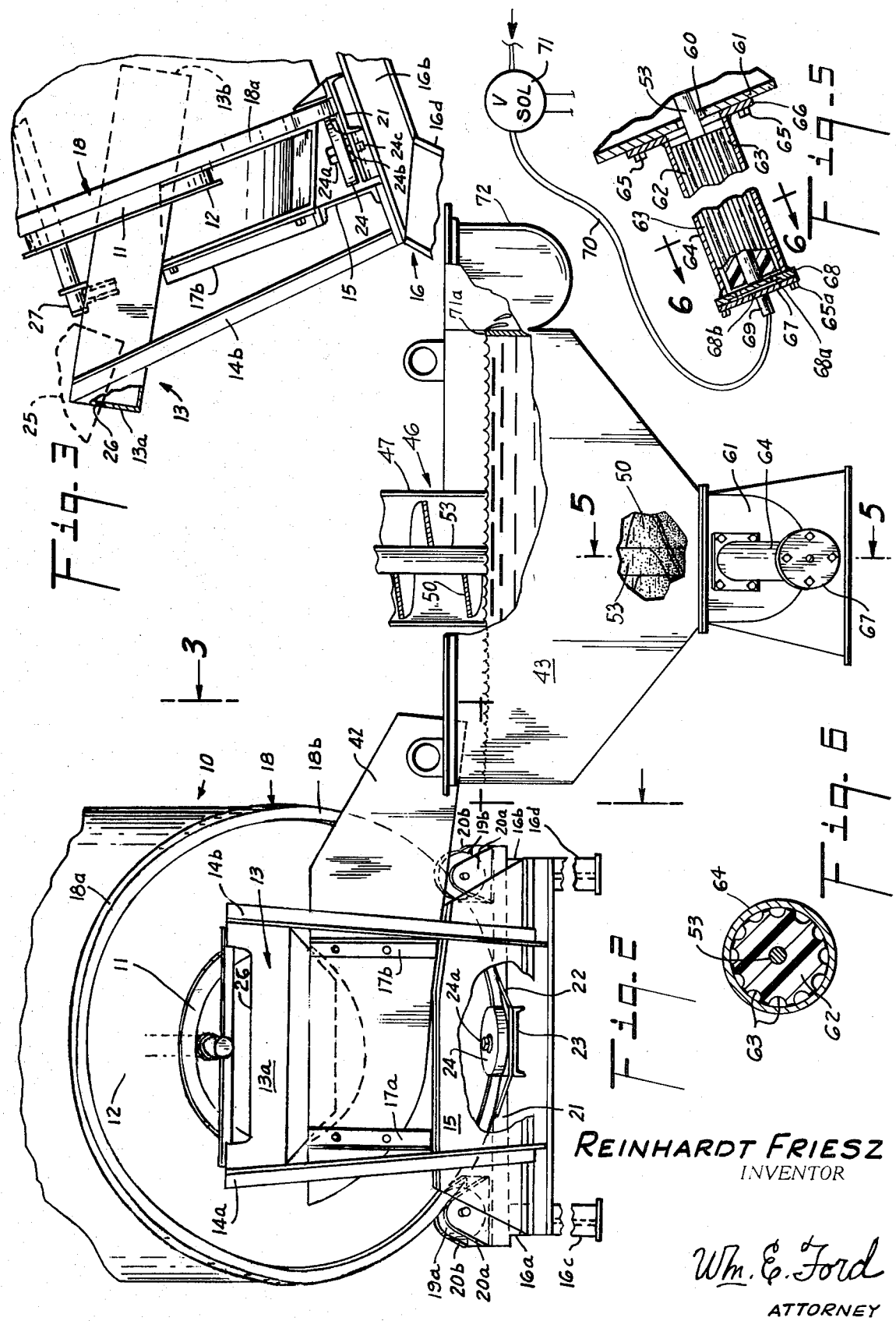

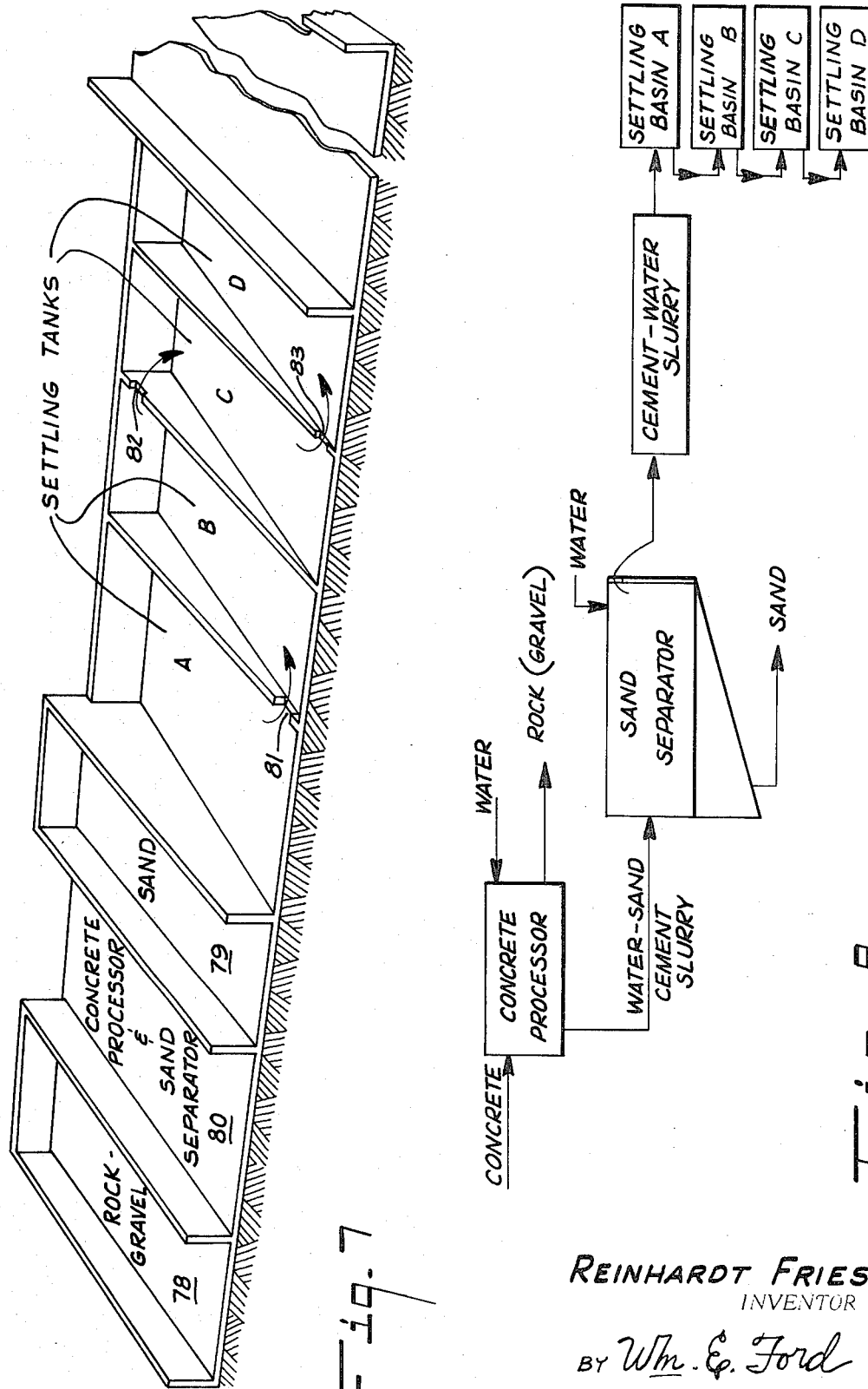

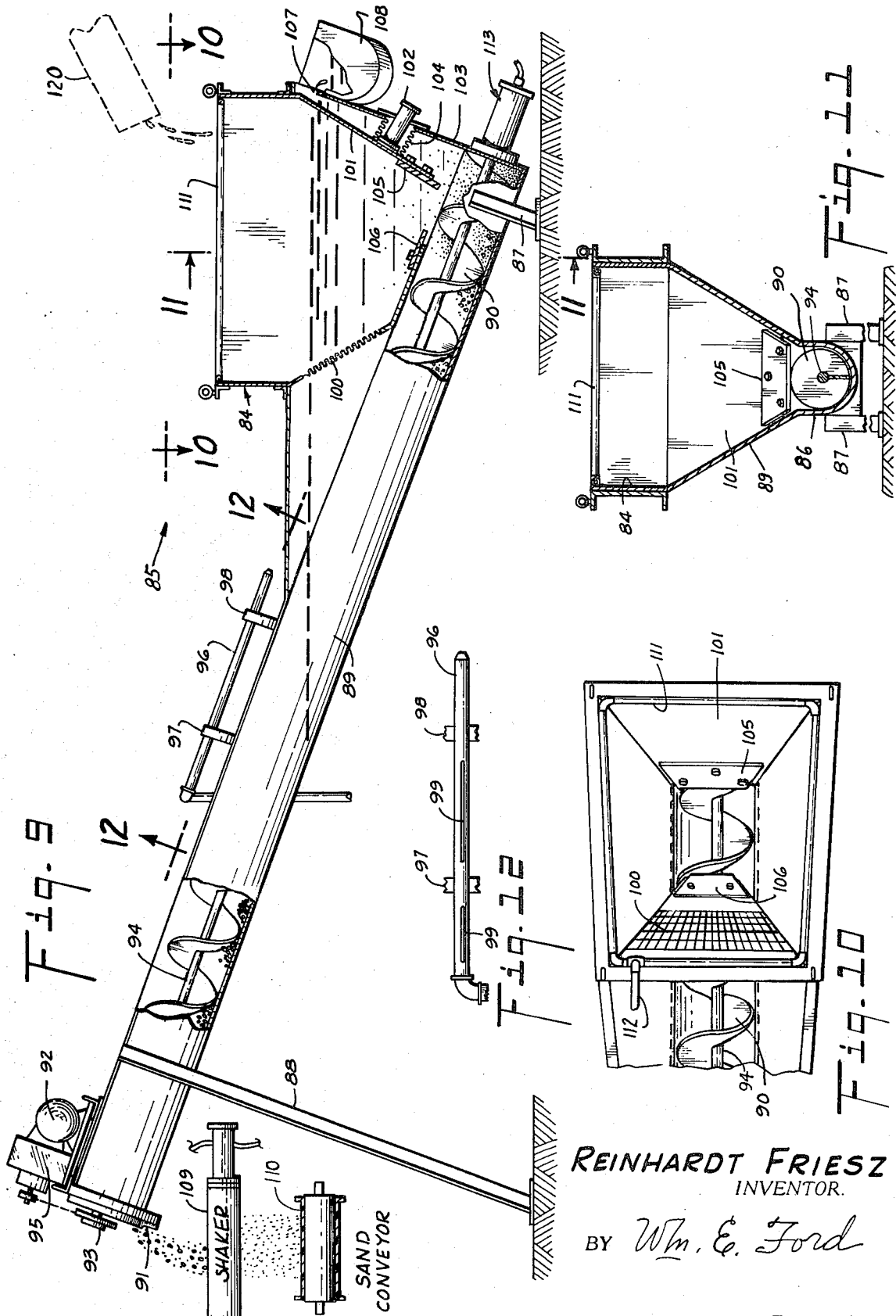

CLASSIFYING SEPARATOR FOR UNPOURED, FLOWABLE ROCK-GRAVEL, SAND AND CEMENT SLURRY MIXTURE FROM CONCRETE MIXER

The invention relates to apparatus for receiving unpoured concrete, in flowable state, from a concrete mixer, then to separate the cement slurry, as over a wier, from the sand and gravel, which may be separated from each other by means within the apparatus in more complex embodiments, or which, in simpler embodiments may be separated, as desired, by separately provided, conventional shaker means.

It is thus a primary object of the invention to provide apparatus for receiving unpoured concrete, in flowable state, from a concrete mixer, then to separate the cement slurry, as over a wier, from the sand and gravel.

It is also an important object to provide apparatus of this class which separates the gravel or rock from cement slurry and sand, and then separates the sand from the cement slurry, which is passed to a succession of settling tanks.

It is another important object of the invention to provide a less expensive and less complicated embodiment of the invention to meet less exacting service requirements, in which the cement slurry, as passed over a wier, is separated from both gravel or rock together with the sand, with these last two ingredients later to be separated, as by conventional shaker apparatus.

It is also a prime object of the invention to provide apparatus and method of this class which can receive the unpoured concrete ingredients from a concrete mixer, in flowable state, with inexpensive recovery of at least the gravel or rock ingredient, and also the sand ingredient, for further use, thus avoiding the loss conventionally occurring by dumping the unpoured ingredients from the mixer at the end of a service run, or at the end of a day or working period.

It is still an important and further object of the invention to provide apparatus and method of this class in which the products entering the initial vessel are backwashed whereby the cement slurry is flushed and stirred until it departs from the machine, as for settling tank separation.

It is also an additional object of the invention to provide apparatus and method of this class with settlement tank included whereby the cement slurry may be successively diluted and divested of its water component.

Other and further objects will be apparent when the specification hereinbelow is considered in connection with the drawings, in which:

FIG. 1 is an elevational view, part in section, of the more complex form of the invention;

FIG. 2 is a transverse elevational view, to larger scale, viewing the rear of the apparatus shown in FIG. 1;

FIG. 3 is an enlarged, fragmentary, elevational view, taken along line 3—3 of FIG. 2, taken transversely through sand and slurry discharge chute;

FIG. 4 is an enlarged, fragmentary, transverse elevational view, taken along line 4—4 of FIG. 1, showing drum helix construction to larger scale;

FIG. 5 is an enlarged, fragmentary, longitudinal sectional elevational view, partially diagrammatic, taken along line 5—5 of FIG. 2, showing water lubrication of lower end of sand lift helix shaft;

FIG. 6 is an enlarged, fragmentary, longitudinal sectional elevational view, taken along line 6—6 of FIG. 5;

FIG. 7 is an isometric view showing relative location of separator mechanism shown in transverse elevation in FIG. 2, together with successive settling tanks for the cement slurry;

FIG. 8 is a flow diagram of the separation accomplished by the apparatus hereinabove described, as indicated diagrammatically in FIG. 7, and as hereinabove disclosed in FIGS. 1–6, inclusive;

FIG. 9 is a longitudinal elevational view, part in section, of a less complex form of the invention than that shown in FIGS. 1–8, inclusive;

FIG. 10 is a fragmentary plan view, taken along line 10—10 of FIG. 9;

FIG. 11 is a fragmentary, transverse, sectional elevational view, taken along line 11—11 of FIG. 9;

FIG. 12 is a fragmentary, enlarged bottom view, taken along line 12—12 of FIG. 9;

FIG. 13 is a fragmentary, enlarged elevational view, part in section; showing a lift helix and shaft construction, applicable to the rock-gravel and sand lift helix of FIG. 9, and also to the sand lift helix of FIGS. 1 and 2; and FIG. 14 is a fragmentary, enlarged elevational view, part in section, showing a modification of the lift helix and shaft construction shown in FIG. 13, and also applicable to the rock-gravel and sand lift helix of FIG. 9, and also to the sand lift helix of FIGS. 1 and 2.

Making reference now to the drawings in which like reference numerals are applied to like elements in the various views, a form of the invention is shown in FIG. 1 as comprised first of a rotated drum 10 to receive a spout 13 thereinto through a rear end opening 11 as provided by a rear inlet flange 12; the spout 13 being fixedly disposed to extend from a rear, outer end 13a, FIGS. 1, 2, 3, as positioned by uprights 14a, 14b, and passed through the lower portion of the angle flange inlet 12, to bear thereupon, with discharge end 13b terminating a distance within the drum 10. A cross-channel 15 upstands across sloped, longitudinally spaced apart, runner channels 16a, 16b of the drum support frame 16, and uprights 17a, 17b upstand from the aforesaid cross-channel 15 for connection to the under side of the spout 13 to give it two point anchorage in longitudinal direction. The runner channels 16a, 16b connect at their lower ends, respectively, with sloped uprights 16c, 16d.

The rear end corner of the drum 10 includes a bearing angle 18 with side leg 18a bearing on each side near the lowermost portion against oppositely disposed rollers 19a, 19b with axles supported on respective pairs of brackets 20a, 20b, which are mounted on the opposed ends of a cross-channel 21 which extends across and slightly outwardly, on each side, of the respective runner channels 16a, 16b of the support frame 16. As indicated in FIGS. 2 and 3, there is rigidly connected to the cross-channel 21, centrally thereof, the upper edge of a gusseted bearing plate 22, a channel portion 23 being installed under the bearing plate 22, centrally thereof, with flanges extending longitudinally in turn to support the bearing plate 22 in depth, as gussets. A roller 24 has a hub 24a with under face to bear frictionally in rotation upon the bearing plate 22 as the roller peripheral areas bear successively in rotation against the lower leg 18b of the bearing angle 18 about the lower end of the drum 10. The axle 24b of the roller 24 has a head to bear upon the upper face of the roller, while the shank of the axle passes centrally through the roller 24, its hub 24a, the bearing plate 22 and the web of the channel portion 23, to be retained by a transverse pin 24c passed through the shank below the channel web.

As best shown in FIG. 3, the discharge spout 25 of a concrete mixer, in phantom lines, rests upon the relieved surface 26 of the rear end plate 13a of the fixed spout 13, when the concrete mixer, not shown, discharges the still flowable mixture of concrete, sand, rock-gravel, carried by mixing water, into the aforesaid fixed spout 13, from which it flows from the forward end 13b into the interior of the drum 10.

A wash pipe 27 extends through a front discharge opening 28 into the front of the drum 10, FIG. 3, and angularly downwardly and rearwardly through the drum 10 to pass out through the upper part of the rear opening 11, through the rear inlet flange 12. The rear end 27a of the wash pipe 27 is closed, and water enters the wash pipe from a conventional source of water supply 27d, as the wash pipe 27 is supported by a riser or pipe cradle 27b which upstands from the central portion of a cross-plate or member 27c across the forward portions of the runner channels 16a, 16b. The support frame 16 for the drum 10 provides a pair of forward sloped supports 16e, in alignment with the upright channel members 16c, 16d, FIG. 2, with tops to support the runner channels 16a, 16b thereon, as indicated by the support channel 16e shown supporting the forward portion of the runner channel 16b, FIG. 1. In addition to the cross-plate or member 27c, a cross-channel 27e, FIG. 1, is shown tying together the forward end portions of the runner channels 16a, 16b.

The uppermost portion of the drum 10 is supported by oppositely disposed rollers 28 carried by brackets 29 fixed to transverse channel 30. The rollers are disposed for supporting engagement with a structural support flange 31 defined about the exterior periphery of drum 10. Drum 10 is rotated on the rollers 19a, 19b and 28 by a motor illustrated in phantom at 32 in FIG. 1. Motor 32 is operative, through a suitable left drive 33 and reduction gear train 34 to impart driving rotation through a pinion gear 35 to a planetary gear 36 fixed to the outer periphery of drum 10.

As the drum 10 is rotated by the motor 32, rock-gravel, sand and cement slurry mixture that has been dumped through the drum opening 11 by the spout 13 will be engaged by a perforated helix 38 that is fixed to the inner periphery of the drum, and will be carried upwardly toward the upper or discharge extremity of the drum. As viewed in greater detail in FIG. 4, helix 38 is provided with small perforations 39 adjacent the inner periphery of the drum that will allow passage of sand and cement slurry therethrough but will prevent passage of rocks and gravel. The helix also includes larger perforations 40 that will allow passage of coarse sand and slurry but prevent passage of rocks and gravel.

As the drum rotates, driving the helix 38, water is injected into the drum through a plurality of nozzles 41 formed in or otherwise fixed to the wash pipe 27. These nozzles 41 evenly dispurse the water on the rock-gravel, sand and cement slurry mixture as it travels upwardly and serves to wash the finer sand and cement particles downwardly through the helix perforations 39 and 40 to the lower sand and cement slurry discharge spout 42 which has fixed thereto the spout support uprights 17a and 17b which also support the inlet spout 13 thereon, as aforesaid.

Overflowing sand and cement slurry will flow through the spout 42 into a settling tank 43 while the washed rock and gravel will be carried upwardly by the helix 38 to the upper discharge extremity 44 where it is deposited on a conveyor belt 45 or other suitable means for transporting the rock and gravel to a receiving and storage facility therefor. A support frame 37 for the conveyor belt 45 is indicated diagrammatically as being provided on the far side of the drum 10, a channel beam 37a is indicated as being cantilevered from the aforesaid drum frame runners 16b, 16a, to the off side thereof, FIG. 1, as part of the frame 37, the drive 45a for the conveyor belt 45 also being indicated as supported from the off side support frame 37. The rock and gravel from the discharge 44 to the conveyor belt 45 may be delivered to a conventional vibration gravity classifier in order to separate the rock and gravel components of the mixture prior to storing them in respective facilities.

In order to achieve separation of the sand and cement slurry mixture deposited via the discharge spout 42, into the settling tank 43, the settling tank is provided with a helix conveyor, illustrated generally at 46 that includes a generally U-shapted trough or housing 47 fixed to the wall structure of the settling tank and defining a portion of the bottom wall of the settling tank. A transverse brace 48 is fixed to the U-shaped housing and cooperates with a secondary or gusset brace 49 to provide a support for both the settling tank 43 and the U-shaped housing 47. A helix conveyor 50 is disposed within the U-shaped housing for rotation by a motor 51 and suitable reduction gearing 52. As illustrated in detail in FIG. 13, the helix conveyor includes a shaft 53 about which is disposed a helix 54.

As illustrated in detail in FIGS. 5 and 6, the lower extremity of the helix conveyor shaft 53 extends through an opening 60 in the end wall 61 of the U-shaped housing 47. A bearing housing 64 is connected to the helix housing end wall 61 by a plurality of bolts 65 that extend through an end flange 66 of the bearing housing 64. A bearing element 62, indicated to be of plastic in FIGS. 5 and 6, is press-fitted into the bearing housing 64 and is thus non-rotatable to receive the helix shaft 53 for rotation therethrough. A thrust bearing plate 68 as of specially hardened alloy copper, is installed as outer end closure of the bearing housing 64, the end of the helix shaft 53 bearing on the inner face of the thrust bearing plate 68 while the bearing element 62 terminates slightly short thereof within the bearing housing 64. The periphery of the bearing housing 64 is fluked to provide a plurality of grooves 63 therein-between the flukes; the thrust bearing plate 68 has perforations 68a therethrough and provides a recessed space 68b in the outer face thereof, all for purposes to be hereinbelow described.

The bearing housing 64 is provided with a closure plate 67 that is fixed to the bearing housing by bolts 65a and includes an injection conduit 69 through which water is injected in order to provide coolant for the bearing element 62 and rotated shaft 53. Water is injected under pressure from a suitable source, not shown, through a supply conduit 70 under control of a solenoid valve 71 which may be energized selectively or automatically as desired. The water, for lubrication, passes from injection conduit 69 through the closure plate 67, via space 68b and perforations 68a, into the bearing element grooves 63.

As the helix 50 is rotated by the motor 51, the sand and cement slurry that has been deposited, (dripped or splashed) into the settling tank will be thus further agitated. The finely carried cement is considered very close to the specific gravity of water, and its particles will readily separate from the heavier sand particles and will be carried with the agitated water to the upper portion of settling tank where it will exit through the wier 71a of an overflow slurry discharge spout 72 which is connected to a trough 73 adapted to transport the slurry material to appropriate settling basins therefor.

The sand, being denser than the slurry, will settle to the lower portion of the settling tank 43 and will be conveyed upwardly by the helix 50. A slurry wash pipe 74 is disposed above the housing 47 and includes a plurality of longitudinally spaced apart spray outlets lowermost there through, slich as a succession of elongated spray slots 75 or other suitable spray nozzles, indicated diagrammatically in FIG. 1. Such sprays allow water to be sprayed in evenly distributed manner into the helix conveyor to wash the cement slurry from the sand and cause the slurry to flow downwardly back into the settling tank. Washed sand will exit at the upper discharge outlet 76 of the conveyor and will be deposited on a conveyor belt 77 or other suitable means for transporting the washed sand to a storage facility therefor.

As illustrated in FIG. 7 a work station for the machine of FIG. 1 includes a rock-gravel bin 78 and a sand storage bin 79 that are disposed on either side of an area 80 in which is placed the classifying separator. Slurry settling basins A, B, C and D are provided to achieve final separation of the cement particles from the water in which it is suspended. Slurry is first deposited from the trough 73 into the basin A and as this basin fills the water exits through the opening 81 into basin B. Larger particles of the cement will remain in the settling basin A for final removal.

Some of the smaller cement particles will be carried into compartment B where further settling will take place and water will flow serially through the openings 82 and 83 into the settling basins C and D. The entire classification separation process is schematically illustrated in FIG. 8. Explanation of phenomena may reside in theory that cement finely particularized, includes water in particle structure, so that particles have almost specific gravity of water, and float with slightest agitation. As particles adhere or coalesce water is free; therefore the cement particles contract as they unite, hence the heavier cement unions are denser and also the more massive or larger parts that settle earlier in the earlier settling basins. Thus, the slurry is lighter and lighter as it reaches the lower settling basins, and being so near the specific gravity of water, only ceases floating and settles in the lowest basin D after this basin becomes quite still, and then the settled cement is in very small parts.

With reference now to FIGS. 9, 10, 11 and 12, a simplified embodiment of this invention includes a classifier 85 including a settling tank or vessel 84 which receives rock-gravel, sand and cement slurry mixture from a concrete mixer discharge spout 120 shown in dotted lines, upper right, FIG. 9. The settling tank 84 is generally rectangular at its upper extremity and is tapered downwardly and inwardly at its sides to a generally U-shaped lower portion 86.

Braces 87 are fixed to the U-shaped portion of the settling tank and provide supports for one extremity of the separator while the other extremity thereof is supported by braces 88. The U-shaped bottom wall of the settling tank extends upwardly and defines a housing 89 in which is disposed a helical conveyor 90 for transporting rock-gravel and sand upwardly to a discharge opening 91. The helical conveyor is rotated within housing 89 by a motor 92 that energizes a pulley or sprocket 93 fixed to the conveyor shaft 94 through a suitable reduction gear mechanism 95. A bearing 113 of similar construction and operation as the bearing of FIG. 5 is provided to support the lower extremity of the shaft 94 of the helical conveyor. As the helical conveyor 90 is rotated, water is transported above the conveyor by a wash pipe 96 connected to the conveyor housing by brackets 97 and 98.

As illustrated in FIG. 12, the wash pipe is provided with elongated spray slots 99 that allow an evenly distributed spray of water to be injected under pressure into the conveyor along the length thereof. The water will wash the cement slurry from the rock-gravel and sand mixture thereby causing the slurry to flow downwardly back into the settling tank 84. Sand and other lightweight material carried downwardly by the water will be prevented from reentering the settling tank by a screen 100 or other appropriate filtering device that will allow passage of cement slurry therethrough.

As the partition 101 is vibrated and water is fed into the settling tank 84 by washing of the rock-gravel, the sand and slurry mixture is being conveyed upwardly as described hereinabove. The excess water and slurry mixture will flow through an overflow opening 107 and into a cement slurry discharge trough 108. The discharged slurry may flow from the trough 108 into a plurality of serially arranged settling basins in the manner discussed hereinabove. Simultaneously, washed rock-gravel and sand mixture will be conveyed upwardly to the discharge opening 91 where it will fall into suitable classification shaker means 109 for separation. Optionally both the rock-gravel and sand may be deposited directly on a conveyor belt 110 for transportation to a storage facility in mixed form as desired.

A cleaning conduit 111 is disposed at the upper extremity of the settling tank 84 and is communicated by a water supply conduit 112. The cleaning conduit is operative to supply water to wash the sides of the settling tank during operation of the machine and to supply sufficient water to achieve proper separation of the slurry from the other components of the mixture.

The settling tank 84 is also provided with a depending wall 101 that is fixed to the tank at the upper extremity thereof. A vibrating mechanism 102 is fixed both to the outer wall 103 of tank and to the depending partition 101 in order to achieve vibration of the depending partition to achieve supplemental agitation for optimum settling of the sand and other light weight particles of the mixture.

A protective bellows 104 surrounds the vibrating mechanism and protects it from contact with the mixture. An adjustment plate 105 is bolted or otherwise fixed to the depending partition 101 in order to allow adjustment of the degree of agitation that may be achieved from the partition. Adjustment of the effective size of the tank area subjected to agitation by the helix 90 may be achieved by adjusting an adjustment plate forming a wall structure immediately above the U-shaped bottom wall 86.

The helix conveyor 50 shown in FIGS. 1 and 2, is also shown in FIG. 13 as including a transfer element as the helix 54, indicated as being formed of a continuous spiral member or preformed plastic. Any conventional means may be employed to affix the helix 54 to the shaft 53, as by gluing. In FIG. 13 a substantial mass of set cement, or a piece of rock-gravel 119, is shown as having, through inadvertence, arrived at the position indicated, as in the settling tank 43, FIG. 2. Since the helix material 54 may be substantially yieldable or flexible, for instance, as some plastic materials are inherently. Thus helix 54 may yield to the rock-gravel or cement mass 59, so that it may pass thereby in continued rotation, or else the helix conveyor 50 could be ruptured at some point due to such obstruction.

A modification of helix indicated by reference numeral 114 may be employed as a helix of some flexibility or yieldability, as illustrated in detail in FIG. 14. In this form of helix a plurality of helix supports 115 are fixed to the shaft 53 or 94, or to any other helix shaft 117 that may be employed with the inventions hereinabove described. Helix bolt openings receive bolts 116a, 116b, therethrough that fix helical laminations of elastomeric material 118 and fibrous material 119 against the helically projected bar or upright 115. The bars, posts or helix supports 115 are generally spaced apart one pitch distance or one complete convolution of the helix, but this spacing may be varied as requirements of performance may demand.

The elastomeric material and fibrous material may be any one of a number commercially available materials that serve to prevent excessive wear to parts subject to contact by abrasive materials. Obviously the elastomeric and fibrous lamination may quite easily be replaced when wear does occur in time thereby obviating the necessity for complete replacement of the helix. Although not illustrated in FIG. 14, the helix 113 may be composed of a plurality of helix segments that are joined in end to end abutment, thus a helix joint being completed by four bolts 116a (2) and 116b (2) on each post or upright 115. Obviously, in the event the helix 113 should become worn or damaged it is only necessary to replace the damaged segment through the use of ordinary tools.

In view of the foregoing it is apparent that I have provided novel apparatus for the purpose of separating gravel or rock and sand from an unpoured and unhardened concrete slurry mixture. Through the use of a machine constructed in accordance with the scope of this invention it is possible to reclaim the components of a concrete mixture and to eliminate the problem of disposing of unused concrete. The invention is of simple nature and is reliable in use. The invention therefore accomplishes all of the objects hereinabove set forth together with other objects and advantages that are obvious from the nature of the invention.

We claim:

1. A classifying separator comprising a conveyor housing and a receiving and settling tank adapted to receive unpoured rock-gravel, sand and cement slurry in unhardened flowable mixture thereinto, said conveyor housing comprising a lower portion of said tank and extending upwardly from a rear end of said settling tank in inclined position and having therein rotatable helix conveyor means with the lower extremity thereof extending into said settling tank, outlet means provided at the upper end of said conveyor housing for the delivery of sand and rock-gravel from said conveyor housing, screen means extending across said settling tank intermediate the length of said conveyor housing for inhibiting the settling into the rearward end of said settling tank of rock-gravel started upwardly by said conveyor means, classifying means for separating sand and rock-gravel, means transporting the separated sand and rock-gravel to storage facilities therefor, washing means for flushing cement slurry from the sand and rock-gravel being conveyed upwardly and to wash said cement slurry into said settling tank, said screen means defining a barrier to allow cement slurry to flow rearwardly into said settling tank while simultaneously inhibiting the flow of rock-gravel thereinto, said settling tank having an overflow provided in said rear end and an overflow receptacle means disposed to receive the overflow of cement flurry therefrom.

2. A classifying separator as claimed in claim 1, said conveyor means further comprising shaft means, bearing means disposed at the lower extremity of said shaft means and being received within bearing housing means, said bearing means cooperating with said bearing housing means to define a plurality of lubrication passages, water inlet means formed in said bearing housing means and circulating water through said lubrication passages.

3. A classifying separator as claimed in claim 1, said washing means comprising conduit means through which water is injected, said conduit means being disposed adjacent said conveyor means, and having spray opening means formed therein, water being injected through said conduit means to be sprayed in evenly distributed manner on said sand, rock-gravel and cement slurry mixture as it is conveyed upwardly thus to flush the cement slurry downwardly into said settling tank while the sand and rock-gravel mixture continues to be conveyed upwardly toward said outlet means.

4. A classifying separator as claimed in claim 1, said means for removing cement slurry from said settling tank comprising, a trough disposed to receive cement slurry mixture overflowing from said settling tank, a partition member connected at one extremity thereof to said settling tank and extending freely thereinto to define a tortuous path for cement slurry flowing toward said trough, means vibrating said partition to provide for agitation of said cement slurry for final settling of small particles of said mixture.

5. A classifying separator as claimed in claim 1, said conveyor means further comprising shaft means, a plurality of brackets fixed to said shaft means in normal relation therewith, said rotatable helix means comprising a plurality of helix segments fixed to said brackets and forming continuous helix means about said shaft means, alternate layers of resilient and fibrous material removably fixed to said helix means and defining wear surfaces for said helix means.

6. A classifying separator as claimed in claim 1, a plurality of settling basins receiving cement slurry overflowing from said settling tank, said basins being disposed in series relation with the cement slurry flowing into the first of said plurality of basins and then flowing serially into the remainder of said basins where degrees of settling of the cement takes place in each of said settling basins.

7. A classifying separator comprising a conveyor housing and a vessel for receiving rock-gravel, sand and cement slurry in unhardened, flowable mixture thereinto, said conveyor housing comprising a lower portion of said vessel and being inclined to extend upwardly from a rear end of said vessel, conveyor means in said housing for conveying said mixture upwardly from said receiving vessel, outlet means provided at the upper end of said conveyor housing for the delivery of sand and rock-gravel from said conveyor housing, screen means extending across said vessel intermediate the length of said conveyor housing for inhibiting the settling into the rearward end of said vessel of rock-gravel started upwardly by said conveyor means, classifying means for separating sand and rock-gravel, means flushing the cement slurry from the sand and rock-gravel with water while the same are being conveyed upwardly and thereby washing the slurry back downwardly into said receiving vessel, said vessel having an overflow outlet provided in said rear end and an overflow receptacle means disposed to receive overflow cement slurry from said overflow outlet, and means conveying separated rock-gravel and sand from said separator and depositing the same, a vessel mounted agitator to extend within said vessel and connected to an agitating plate extending across said vessel with lower end free whereby to agitate said mixture flowing into said vessel, thus stepping up the separation of the components settling out from said mixture.

* * * * *